March 15, 1932.  F. CLUTTER  1,849,908
POULTRY FEEDER
Filed March 14, 1931
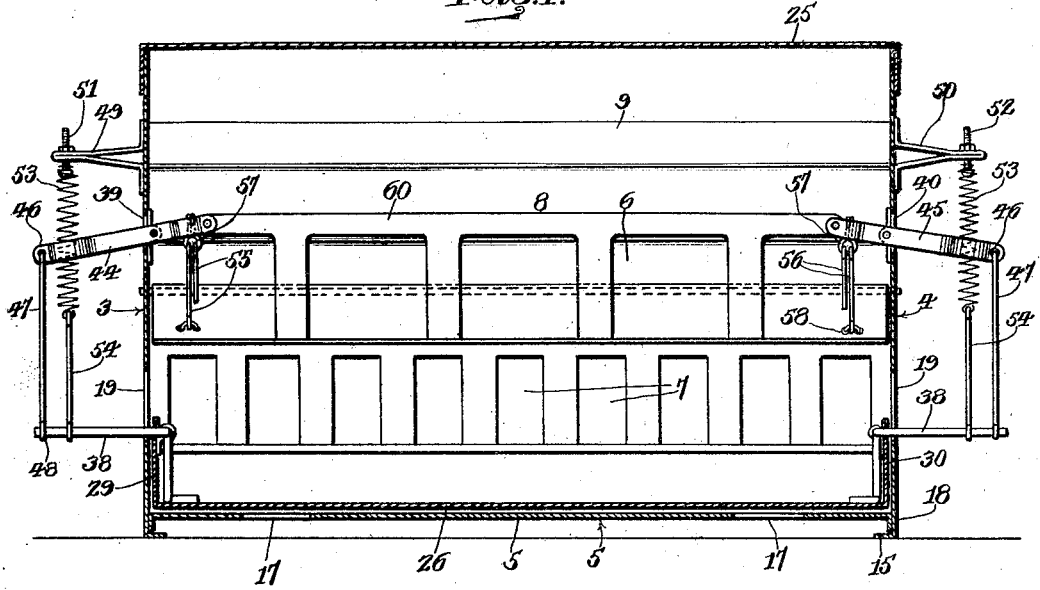
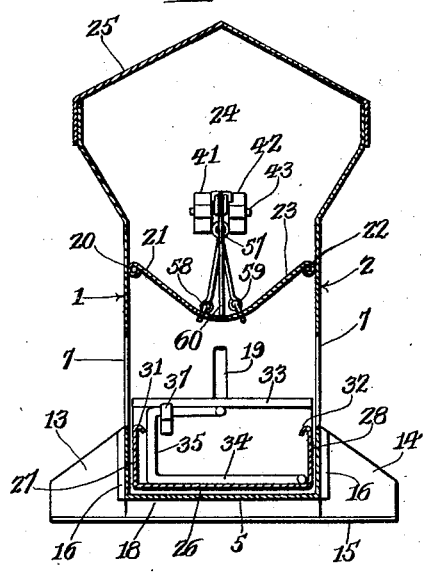
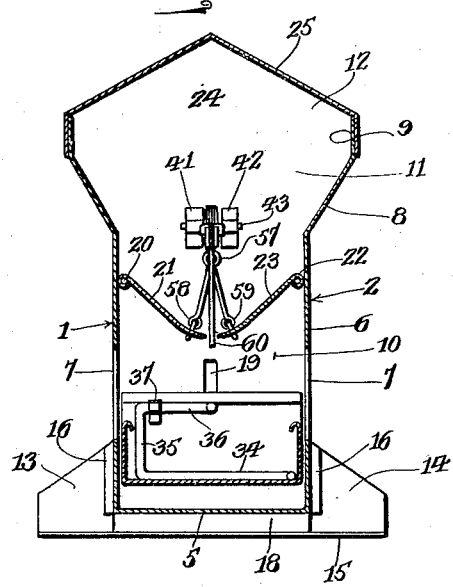
Inventor
*Floyd Clutter*
By
*Geo. P. Kimmel*
Attorney Patented Mar. 15, 1932

1,849,908

UNITED STATES PATENT OFFICE

FLOYD CLUTTER, OF PUKWANA, SOUTH DAKOTA

POULTRY FEEDER

Application filed March 14, 1931. Serial No. 522,625.

This invention relates to a poultry feeder, and has for its object to provide, in a manner as hereinafter set forth, a feeder of the class referred to including a feed pan and spring actuated means controlled by the weight of the feed in the pan for automatically supplying feed to the pan when occasion requires.

A further object of the invention is to provide, in a manner as hereinafter set forth, a poultry feeder including a feed pan, a normally closed feed storage compartment, and spring actuated means controlled by the weight of the feed in the pan for opening said compartment to provide for an automatic supply of feed to the pan when the latter is to be replenished.

Further objects of the invention are to provide, in a manner as hereinafter set forth, a poultry feeder of the automatic type which is simple in its construction and arrangement, strong, durable, compact, thoroughly efficient in its use, permitting of convenient access to the feed by the fowls, readily assembled, and comparatively inexpensive to manufacture.

With the foregoing and other objects in view, the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:—

Figure 1 is a longitudinal sectional view of a poultry feeder in accordance with this invention.

Figure 2 is a vertical sectional view with the feed pan in its lowered position, and with the storage compartment closed.

Figure 3 is a vertical sectional view with the feed pan in an elevated position and the storage compartment open.

Referring to the drawings in detail, the feeder includes an open top housing including front and rear walls 1, 2 respectively, a pair of end walls 3, 4 and a bottom 5. The front and rear walls are of like construction, substantially of rectangular contour and oppositely disposed relatively to each other. The front wall 1 and rear wall 2 includes a vertically disposed lower portion 6 formed with a lengthwise extending row of spaced feed openings 7, an intermediate portion 8 which inclines forwardly from its lower to its upper end and a vertically disposed upper portion 9 extending in a plane outwardly from and parallel to the plane of the lower portion 6. The portion 6 is of materially greater height than the portion 9. Each end wall includes a vertically disposed lower portion 10 of uniform width, a flaring portion 11 which extends from the portion 10 and merges into an upper portion 12 having its lower part of greater width than the portion 10 and its upper part tapered. The end walls 3, 4 are suitably secured to the front and rear walls 1, 2. Each end wall at its lower part is formed with a pair of oppositely disposed extensions 13, 14. The bottom of each end wall is flanged as at 15. The lower part of the front wall 1 and the rear wall 2 is flanged as at 16 and such flanges are secured to the inner faces of the end walls. The bottom 5 is apertured as at 17 and is provided at each end with a depending flange 18 which seats upon the flange 15. The flanges 18 are suitably secured to the inner faces of the end walls. The flanges 18 provide for maintaining the bottom 5 above the ground or the support upon which the feeder is positioned. The portion 10 of each end wall, centrally thereof is provided with a vertically disposed slot 19.

Hinged to the inner face of the front wall, as at 20 and projecting from such wall is a closure member 21. Hinged to the inner face of the rear wall 2, as at 22 and extending therefrom is a closure member 23. The members 21, 23 extend towards each other and have curved lower portions 24 which are adapted to abut. The members 21, 23 provide a dumping bottom for a feed storage compartment 24 arranged in the upper part of the housing. The storage compartment 24 is provided by the members 21, 23 upper part of the lower portion 6 of the front and rear walls, intermediate portions 8 of the front and rear walls, upper portions 9 of the front and rear walls, upper parts of the portions 10 of the end walls, intermediate portions 11 of the end walls, upper portions 12 of the end walls and a removable flanged cover 25 which seats on the top edges of the front, rear and end walls and has its flanges oppose the outer faces of the portions 9 of the front and rear walls and the upper marginal portions of the end walls. The members 21, 23 are normally held in abutting position for the purpose of closing the bottom of the compartment 24 and the means to provide for the abutting of members 21, 23 will be presently referred to.

Arranged in the lower portions of the housing is a vertically movable feed pan consisting of a bottom 26, front and rear walls 27, 28 respectively and a pair of end walls 29, 30. The end walls 29, 30 are of greater height than the front and rear walls 27, 28 and project a substantial distance above the top edges of said walls 27, 28. The front wall 27 is inturned at its top, as at 31 to provide a rounded top edge. The rear wall 28 is inturned at its top to provide a rounded top edge 32. The top of each end wall is bent inwardly upon itself, as at 33 for reinforcing the top of the wall.

Attached to each end of the feed pan is a coupling element consisting of a lower arm 34 disposed transversely and seating on bottom 26, a vertically disposed arm 35 projecting upwardly from one end of the arm 34, an inwardly extending arm 36 of less length than the arm 34, disposed in parallel relation with respect to the latter and fixedly secured to an end wall by a clamp 37. The inner end of the arm 36 merges into a right angularly disposed arm 38 which passes through an end wall of the pan and extends outwardly through the slot 19.

The arms 38 project through the end walls of the pan directly below the inwardly bent portions 33 of said end walls.

The end walls 3, 4 of the housing are vertically slotted as at 39, 40 respectively and secured to the inner face of the end walls and arranged at each side of the parts 39 or 40 is a pair of bearing members 41, 42. Mounted in each pair of bearing members is a pivot 43. Extending inwardly through the slots 39, 40 are levers 44, 45 respectively. The levers are oppositely disposed. Each lever is mounted on a pivot 43. The levers project into the chamber or compartment 24. The pivots 43 for said levers are disposed at points between the transverse medians of the levers and the inner ends thereof. Loosely connected to the outer end of each lever, as at 46 is a depending bar 47 which has its lower end connected, as at 48 to the outer end of an arm 38. By this arrangement when the inner ends of the levers 40 are lowered the outer ends of said levers act to elevate the feed pan. When the inner ends of the levers are elevated the outer ends thereof act to lower the feed pan. The action of the levers is had through the connecting rods 47. Projecting outwardly from the end walls of the housing, above the slots 39, 40 are brackets 49, 50 respectively. Carried by the brackets 49, 50 respectively are depending, adjustable screws 51, 52 respectively. The screws 51, 52 have connected therewith and depending therefrom controlling springs 53 which are connected at their lower ends to rods 54 secured to the arms 38 inwardly of the rods or bars 47.

The springs 53 tend to raise the feed pan and the weight of the feed in the pan tends to lower the same. When the pan is lowered the inner ends of the levers are in an elevated position. The levers 44, 45 function to close or open the dumping bottom of the compartment 24. The inner end of the lever 44 has pivotally connected therewith a pair of connecting rods 55 and which are pivotally connected to the closures 21, 22 at one end of the latter. The inner end of the lever 45 has pivotally connected therewith a pair of connecting rods 56 which are pivotally connected to the closures 21, 23 at the other ends thereof. The pivot connection between the pair of connecting rods or members and inner end of a lever is indicated at 57 in Figures 2 and 3 and the pivotal connections between the pairs of connecting rods or members and the closures 21, 23 are indicated at 58, 59 Figures 2 and 3. The pair of rods 55 extend in opposite directions with respect to each other and the rods 56 are arranged in a like manner.

Attached at the inner ends of the levers 44, 45 and bodily movable with such levers is a vertically movable fork shaped member 60 to enable for the feeding of mash as well as other grain. The member 60 prevents the packing of mash and on its downward movement passes between the closure members 21, 23 when compartment 24 is open.

When the fowls reduce the amount of feed in the pan the springs 53 act to elevate the pan, and on such elevation the rods 47 swing the ends of the levers 44, 45 so that the inner ends of such levers are lowered under such conditions opening the dumping bottom of compartment 24 permitting the pan being replenished with feed.

What I claim is:—

1. A poultry feeder comprising a housing having its front and rear provided with feed openings, a vertically movable feed pan within the lower portion of the housing, hinged means above said pan and within the housing and in connection with the upper portion of the latter providing a feed storage compartment having a dumping bottom, and means controlled by the weight of the feed within the pan and connected to the latter, to the housing and to said hinged means for controlling the opening and closing of the dumping bottom of said compartment.

2. A poultry feeder comprising a housing having its front and rear provided with feed openings, a vertically movable feed pan within the lower portion of the housing, hinged means above said pan and within the housing and in connection with the upper portion of the latter providing a feed storage compartment having a dumping bottom, and means controlled by the weight of the feed within the pan and connected to the latter, to the housing and to said hinged means for controlling the opening and closing of the dumping bottom of said compartment, the said last mentioned means including controlling springs connected with the pan and with the housing.

3. A poultry feeder comprising a housing having its front and rear provided with feed openings, a vertically movable feed pan within the lower portion of the housing, hinged means above said pan and within the housing and in connection with the upper portion of the latter providing a feed storage compartment having a dumping bottom for supplying feed to said pan, and means arranged at each end of the housing and controlled by the weight of the feed within the pan for controlling the opening and closing of the dumping bottom of said compartment, the said means at each end of the housing including a lever connected with the pan, pivoted to an end of the housing and attached to said hinged means and further including a controlling spring connected with the housing and with said pan.

4. A poultry feeder comprising a housing having its front and rear provided with feed openings, a vertically movable feed pan within the lower portion of the housing and having its front and rear walls of less height than its end walls, a pair of oppositely disposed closures within and hinged to the housing and forming in connection with the upper portion of the housing a feed storage compartment having a dumping bottom, oppositely disposed arms extending from the ends of the pan and through the ends of the housing, oppositely disposed levers pivoted to the ends of the housing, extending through said ends and pivotally connected with said closures, connecting means between said levers and said arms, and controlling springs connected with the housing and to said arms, the action of said levers being controlled by the weight of the feed in the pan against the action of said springs for controlling the opening and closing of the dumping bottom of said compartment for supplying feed to the pan.

5. A poultry feeder comprising a housing having its front and rear provided with feed openings, a vertically movable feed pan within the lower portion of the housing, closures hinged within said housing above said pan and forming in connection with the upper portion of the housing a feed storage compartment having a dumping bottom for supplying feed to said pan, and a spring controlled mechanism within each end of the housing, said mechanisms being connected to the ends of the pan and ends of the housing and to said closures providing by the weight of the feed in the pan acting to close the dumping bottom of said compartment against the action of the controlling springs and the mechanisms.

6. A poultry feeder comprising a housing having its front and rear provided with feed openings, a vertically movable feed pan within the lower portion of the housing, hinged means above said pan and within the housing and in connection with the upper portion of the latter providing a feed storage compartment having a dumping bottom, means controlled by the weight of the feed within the pan and connected to the latter, to the housing and to said hinged means for controlling the opening and closing of the dumping bottom of said compartment, and a vertically movable fork shaped member arranged within said compartment and connected at the ends of its top to said controlling means.

In testimony whereof, I affix my signature hereto.

FLOYD CLUTTER.